United States Patent
Lee

(10) Patent No.: US 9,143,061 B1
(45) Date of Patent: Sep. 22, 2015

(54) BICYCLE POWER GENERATION DEVICE

(71) Applicant: Wen-Sung Lee, Taichung (TW)

(72) Inventor: Wen-Sung Lee, Taichung (TW)

( * ) Notice: Subject to any disclaimer, the term of this patent is extended or adjusted under 35 U.S.C. 154(b) by 0 days.

(21) Appl. No.: 14/583,774

(22) Filed: Dec. 29, 2014

(51) Int. Cl.
*B62K 25/00* (2006.01)
*H02N 2/18* (2006.01)

(52) U.S. Cl.
CPC . *H02N 2/186* (2013.01); *H02N 2/18* (2013.01)

(58) Field of Classification Search
CPC ................................. H02N 2/186; H02N 2/18
USPC ........................................... 280/281.1, 288.4
See application file for complete search history.

(56) References Cited

U.S. PATENT DOCUMENTS

| | | | | |
|---|---|---|---|---|
| 6,050,585 | A * | 4/2000 | Rai | 280/288.4 |
| 6,789,926 | B2 * | 9/2004 | Chang | 362/473 |
| 6,833,642 | B1 * | 12/2004 | Hung | 310/75 C |
| 6,986,521 | B1 * | 1/2006 | Li et al. | 280/281.1 |
| 2007/0278902 | A1 * | 12/2007 | Rastegar et al. | 310/339 |
| 2009/0243254 | A1 * | 10/2009 | Chiang et al. | 280/281.1 |
| 2013/0188341 | A1 * | 7/2013 | Tseng et al. | 362/183 |
| 2015/0042211 | A1 * | 2/2015 | Pan | 310/339 |

* cited by examiner

*Primary Examiner* — Tony Winner

(57) ABSTRACT

A bicycle power generation device includes a seat tube unit to which a power generation unit is connected. Two rails are clamped between a press plate and a top plate. The top plate has a pressing face in which a recess is defined. A bottom plate has a contact face located corresponding to the pressing face. A protrusion protrudes from the contact face and is located corresponding to the recess. The power generation unit has at least one power generation plate and an output member. The at least one power generation plate is located on the contact face of the bottom plate and electrically connected to the output member. The vibration from the seat activates at least one power generation plate to generate electric power.

4 Claims, 8 Drawing Sheets

BICYCLE POWER GENERATION DEVICE

BACKGROUND OF THE INVENTION

1. Fields of the Invention

The present invention relates to a power generation device, and more particularly, to a power generation device installed to the seat tube unit.

2. Descriptions of Related Art

There more electronic devices are equipped to bicycles to provide safety and more information to the riders, such as headlight, turn lights, or even cardinal information. These electronic devices are powered by electric power, and generally, the power is supplied by a battery pack which can be installed to the bicycle frames. However, the conventional battery packs contaminate environment when they are discarded. Although some battery packs are chargeable, the riders difficult to find proper electric power source to charge the battery packs. The chargeable battery packs cannot last for a long period of time.

The present invention intends to provide a bicycle power generation device to eliminate the shortcomings mentioned above.

SUMMARY OF THE INVENTION

The present invention relates to a bicycle power generation device and comprises a seat tube unit which has a seat tube having a support portion on a top thereof. Two first threaded holes are defined through the support portion and two bolts extend through the two first threaded holes. A press plate has two first grooves and two second threaded holes. The second threaded holes are located corresponding to the first threaded holes. A top plate has two second grooves which are located corresponding to the first grooves. The top plate has a pressing face defined in the underside thereof. A recess is defined in the pressing face. A bottom plate has a contact face and a protrusion. The contact face is located corresponding to the pressing face. The protrusion is located corresponding to the recess. A power generation unit is connected to the seat tube unit and has at least one power generation plate and an output member. The at least one power generation plate is located on the contact face of the bottom plate and electrically connected to the output member. The vibration from the seat activates at least one power generation plate to generate electric power which is supplied to the electronic devices on the bicycle.

Preferably, the recess of the top plate is a semi-spherical recess and the protrusion is a semi-spherical protrusion.

Preferably, the recess is formed in a side of the top plate, and the protrusion protrudes from a side of the bottom plate.

The primary object of the present invention is to provide a power generation device which is activated by the vibration from the seat during riding the bicycle.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
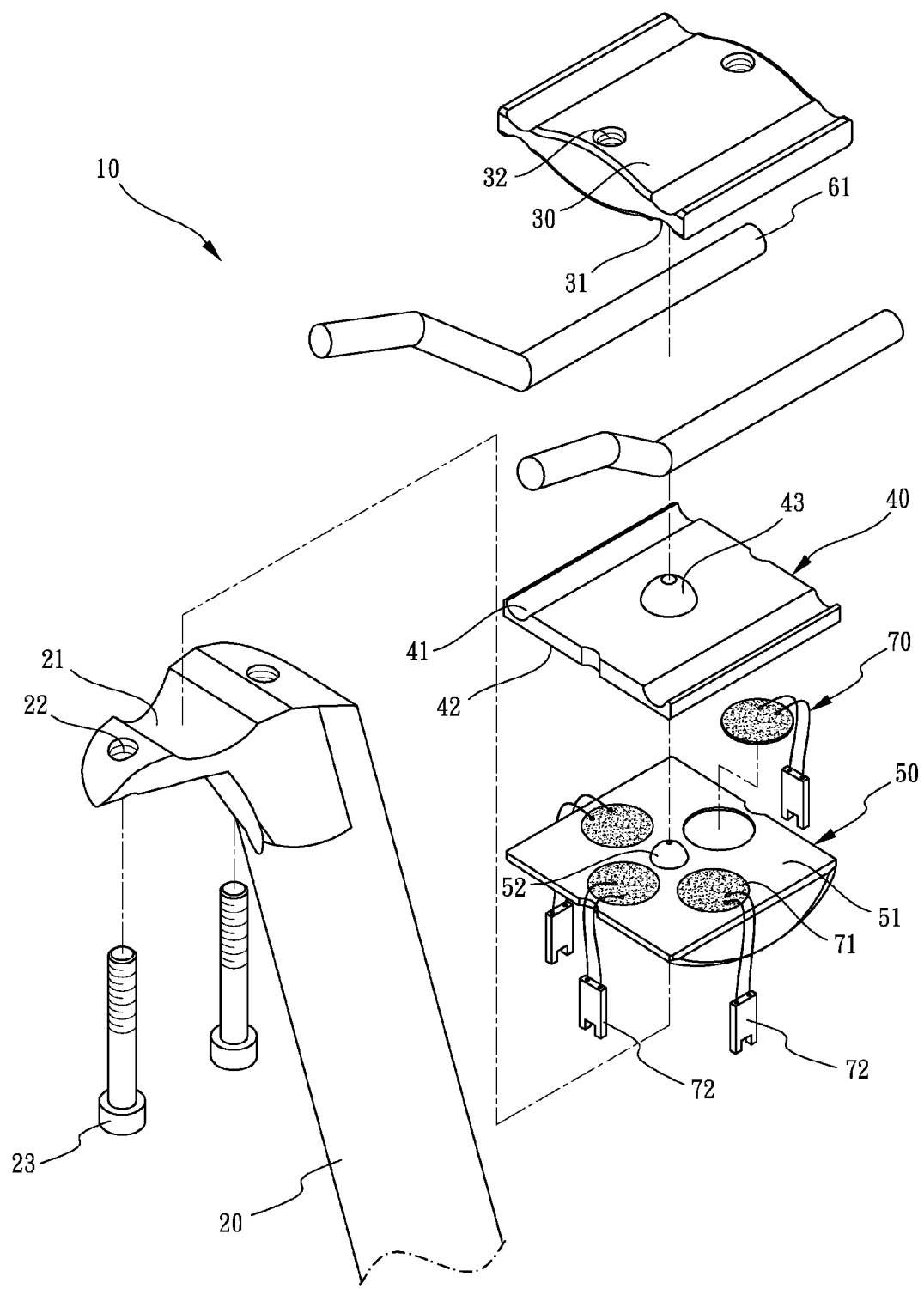
FIG. 1 is an exploded view of the power generation device of the present invention.
Figure 2:
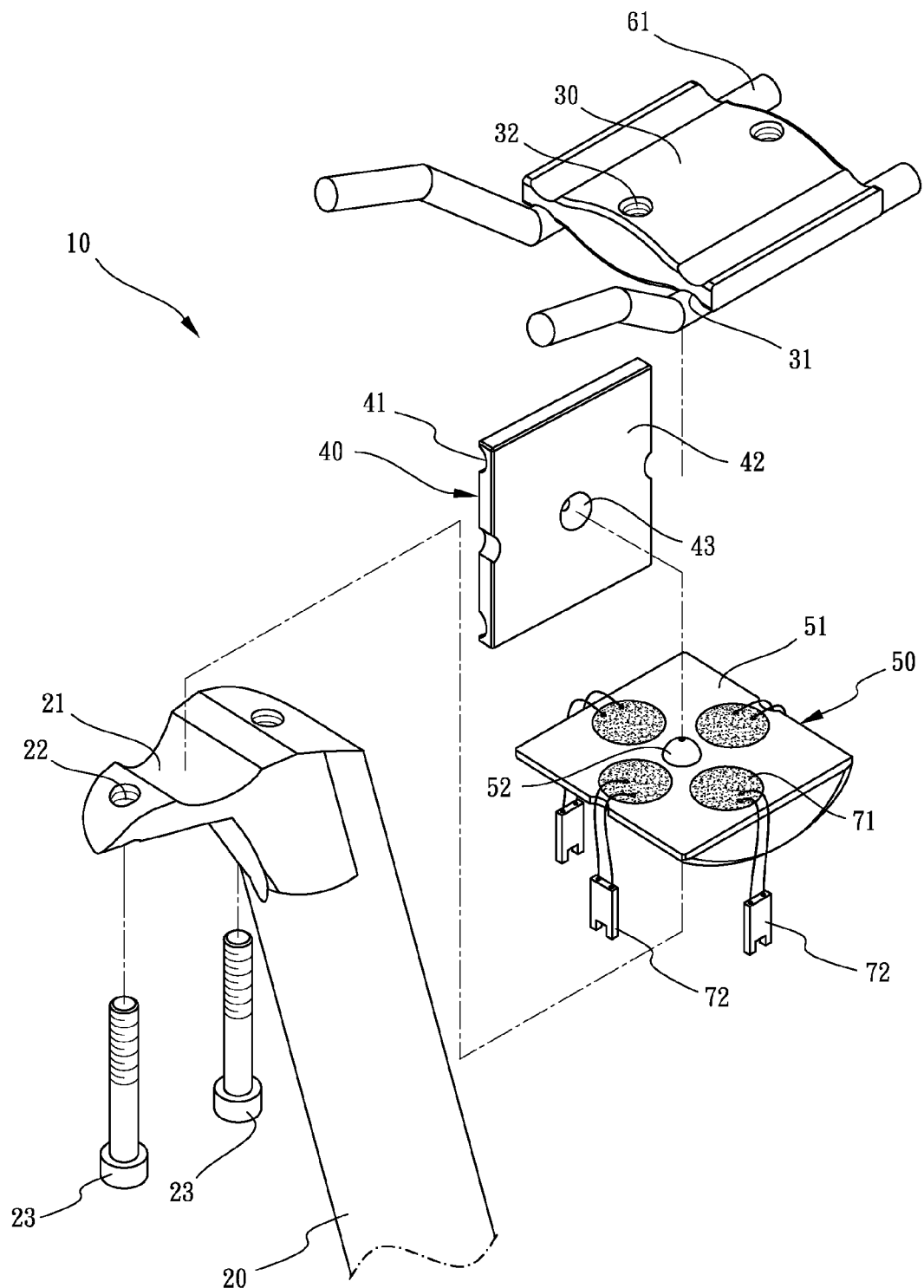
FIG. 2 is another exploded view of the power generation device of the present invention.
Figure 3:
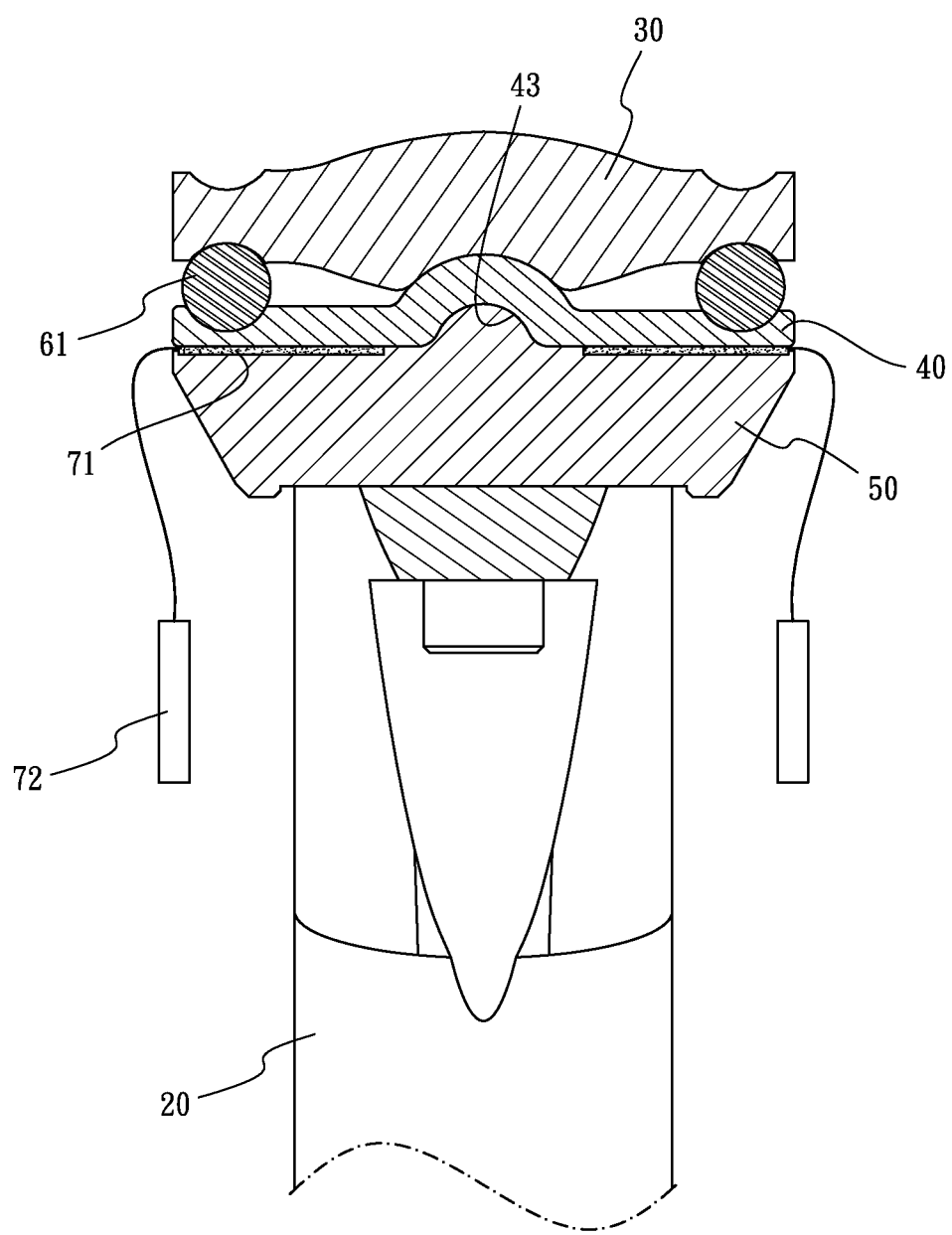
FIG. 3 is a cross sectional view of the power generation device of the present invention.
Figure 4:
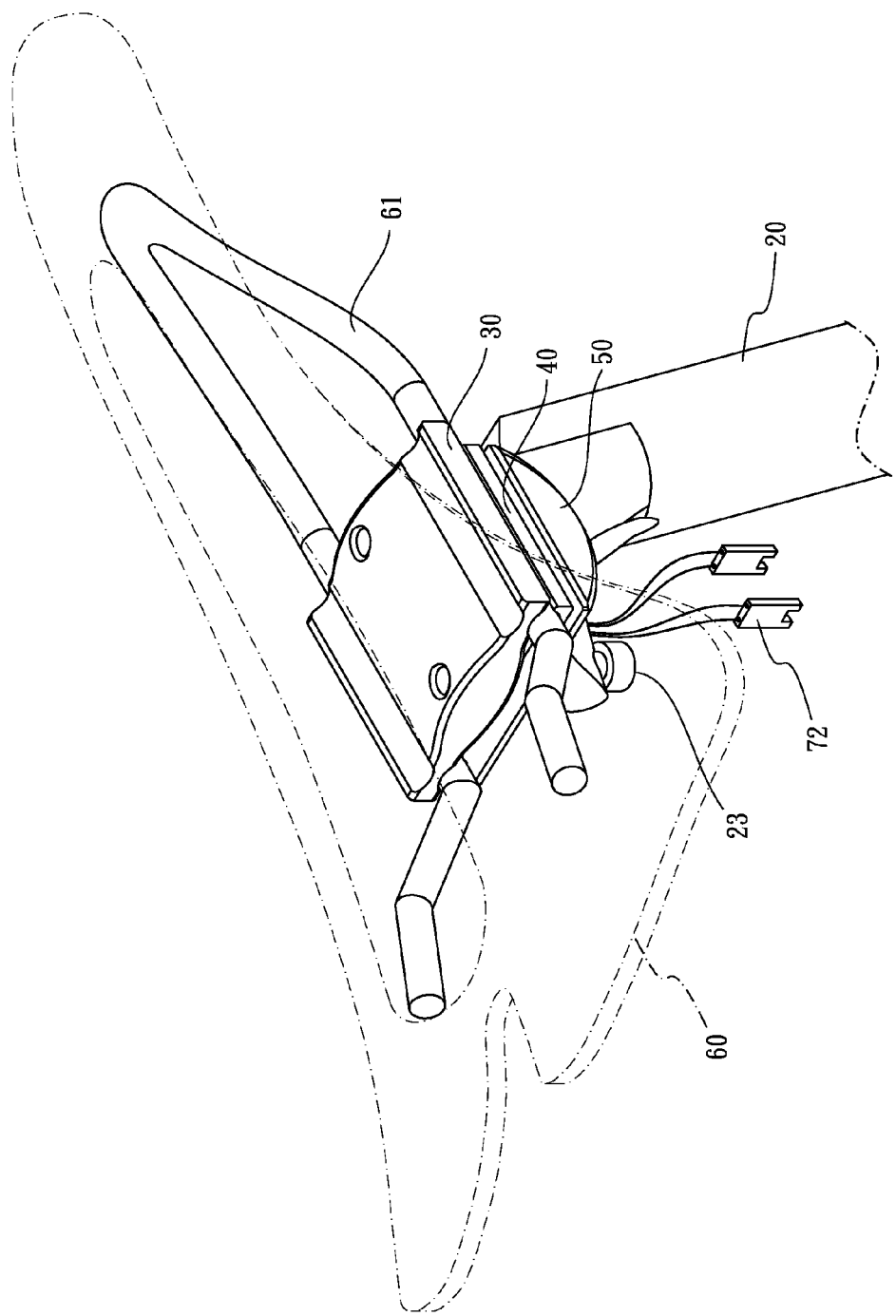
FIG. 4 is a perspective view to show the power generation device of the present invention.

Referring to FIGS. 1 to 4, the power generation device of the present invention comprises a seat tube unit 10 and a power generation unit 70 which is connected to the seat tube unit 10.

The seat tube unit 10 comprises a seat tube 20 which has a support portion 21 on a top thereof. Two first threaded holes 22 defined through the support portion 21, and two bolts 23 extend through the two first threaded holes 22. A press plate 30 has two first grooves 31 and two second threaded holes 32, wherein the second threaded holes 32 located corresponding to the first threaded holes 22. A top plate 40 has two second grooves 41 which are located corresponding to the first grooves 31. The top plate 40 has a pressing face 42 defined in the underside thereof, and a recess 43 is defined in the pressing face 42. A bottom plate 50 has a contact face 51 and a protrusion 52, wherein the contact face 51 is located corresponding to the pressing face 42, and the protrusion 52 is located corresponding to the recess 43. The recess 43 of the top plate 40 is a semi-spherical recess and the protrusion 52 is a semi-spherical protrusion. The engagement between the semi-spherical recess 43 and semi-spherical protrusion 52 has a larger contact area. Two rails 61 are clamped in the space defined between the first and second grooves 31, 41. A seat 60 is connected to the rails 61.

The power generation unit 70 is connected to the seat tube unit 10 and has at least one power generation plate 71 and an output member 72. The at least one power generation plate 71 is located on the contact face 51 of the bottom plate 50 and electrically connected to the output member 72. In this embodiment, there are four power generation plates 71 and each power generation plate 71 is connected to one output member 72. The four power generation plates 71 are located on four different sides of the contact face 51.

In assembling, the bottom plate 50 is connected to the support portion 21, the top plate 40 is then put on the bottom plate 50, wherein the pressing face 42 and the recess 43 are located corresponding to the contact face 51 and the recess 43 so as to be engaged with each other, and the power generation plates 71 are clamped between the pressing face 42 and the contact face 51. The two rails 61 are clamped in the space defined between the first and second grooves 31, 41. The bolts 23 are threadedly connected to the first and second threaded holes 22, 32 to position the press plate 30, the rails 60, the top plate 40 and the bottom plate 50. The seat 60 is connected to the rails 61 and fixed to the top of the seat tube 20.

When riding the bicycle, the movements of the rider applied to the seat 60 and the vibration from the road generate vibration which is applied to the power generation plates 71 which are activated and generate power which is output from the output members 72 to the electronic devices on the bicycle.

The bicycle power generation device of the present invention generates power during operation to the bicycle, the electronic devices on the bicycle are powered without worry of lack of city power outlets.

Figure 5:
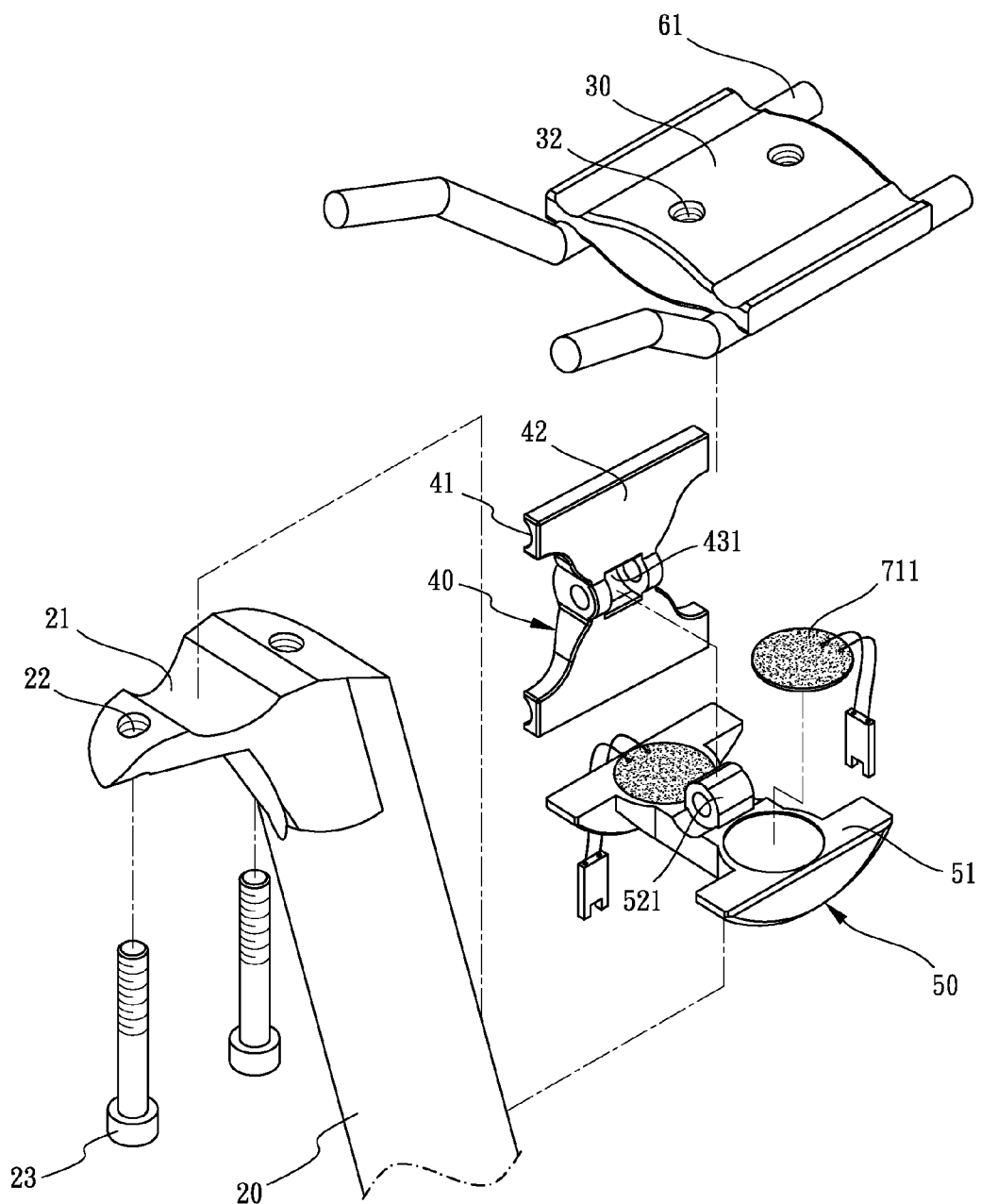
FIG. 5 is an exploded view of the second embodiment of the power generation device of the present invention.
Figure 6:
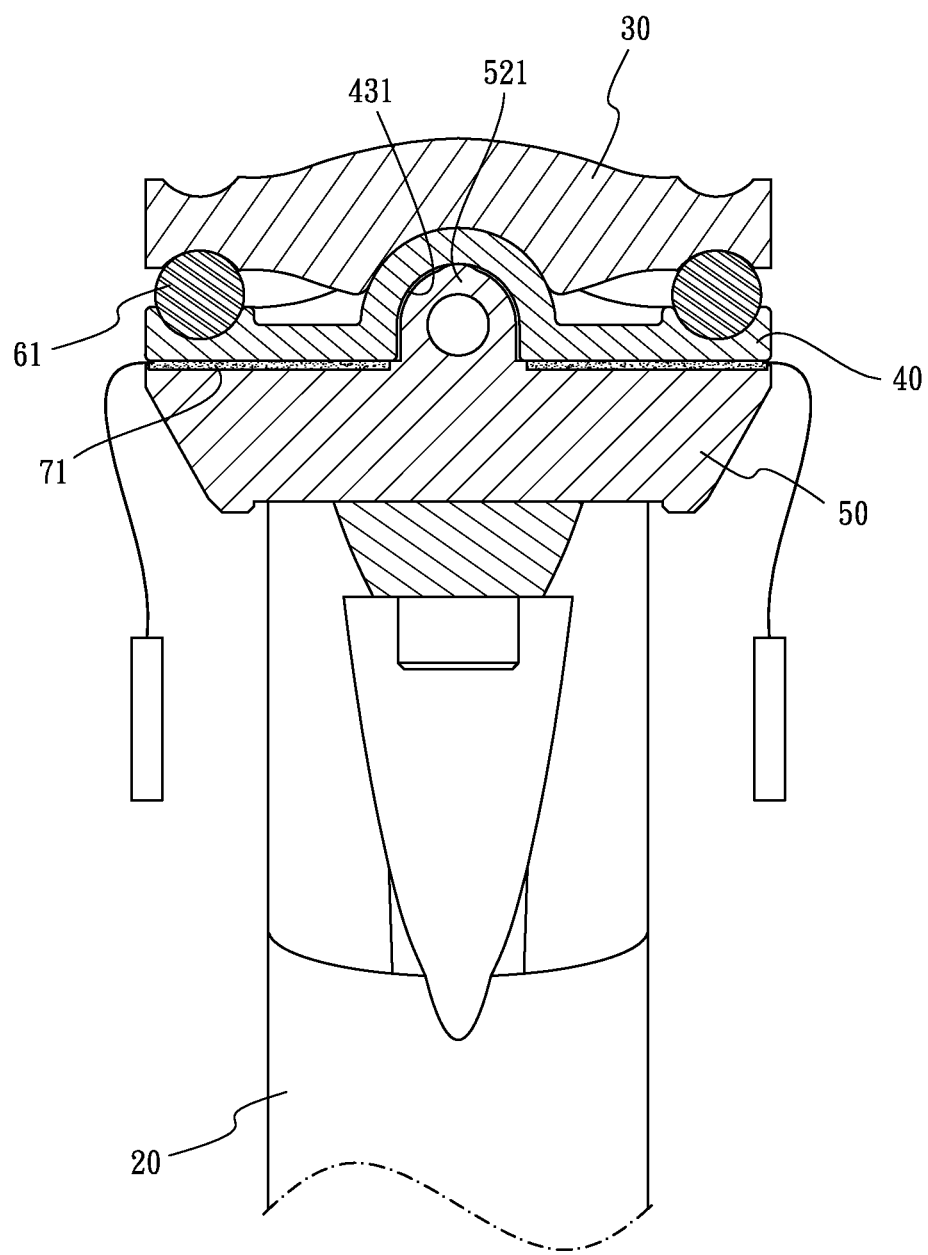
FIG. 6 is a cross sectional view of the second embodiment of the power generation device of the present invention.

FIGS. 5 and 6 show the second embodiment of the present invention, wherein the recess 43 of the top plate 40 is a space 431 defined between two ring-shaped members, and the protrusion 52 is a tubular member 521 which is inserted into the space 431 and pinned by a pin. The engagement between the space 431 and tubular member 521 has a larger contact area. Only two power generation plates 711 are needed and located on two sides of the contact face 51.

Figure 7:
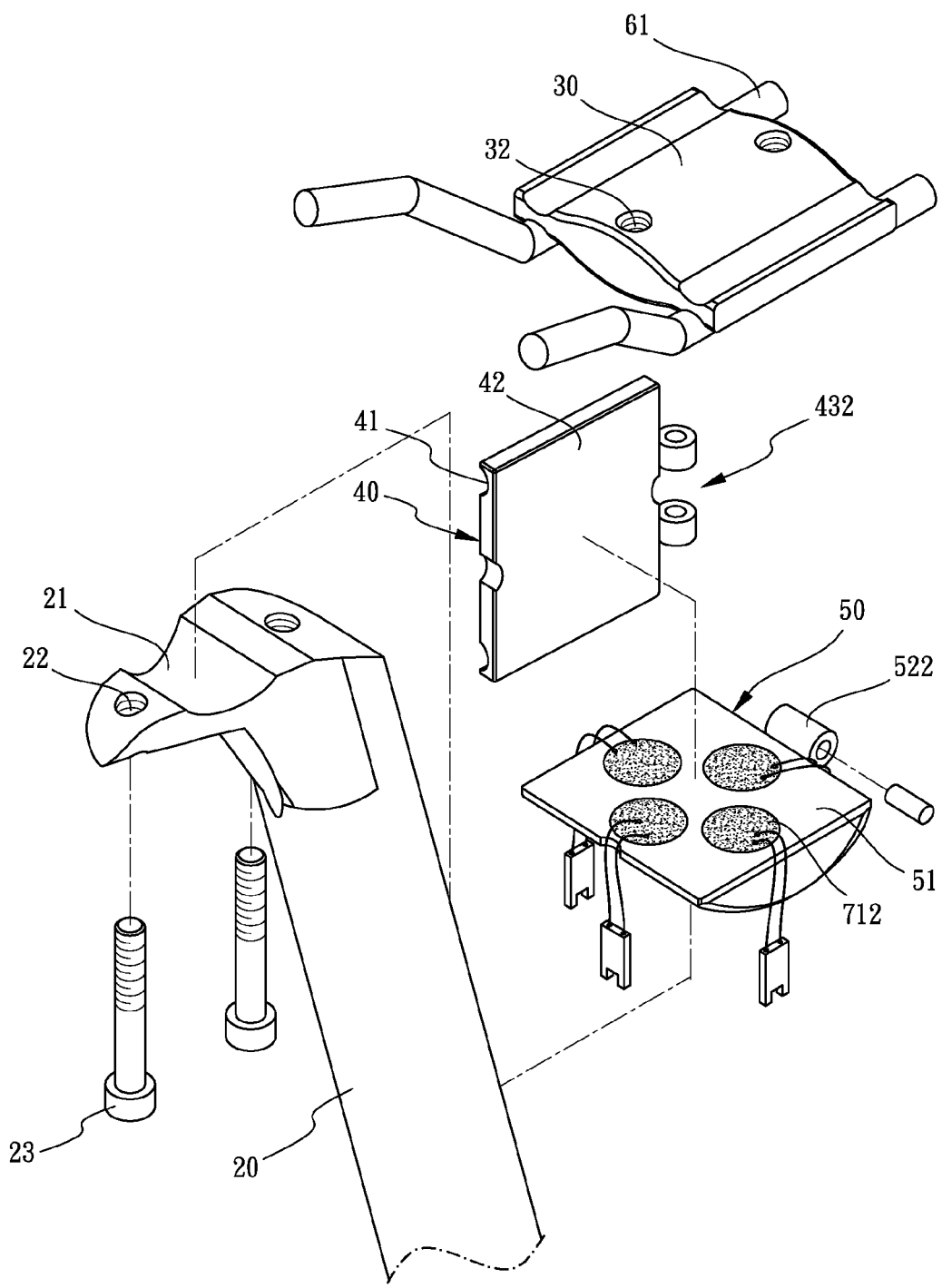
FIG. 7 is an exploded view of the third embodiment of the power generation device of the present invention.
Figure 8:
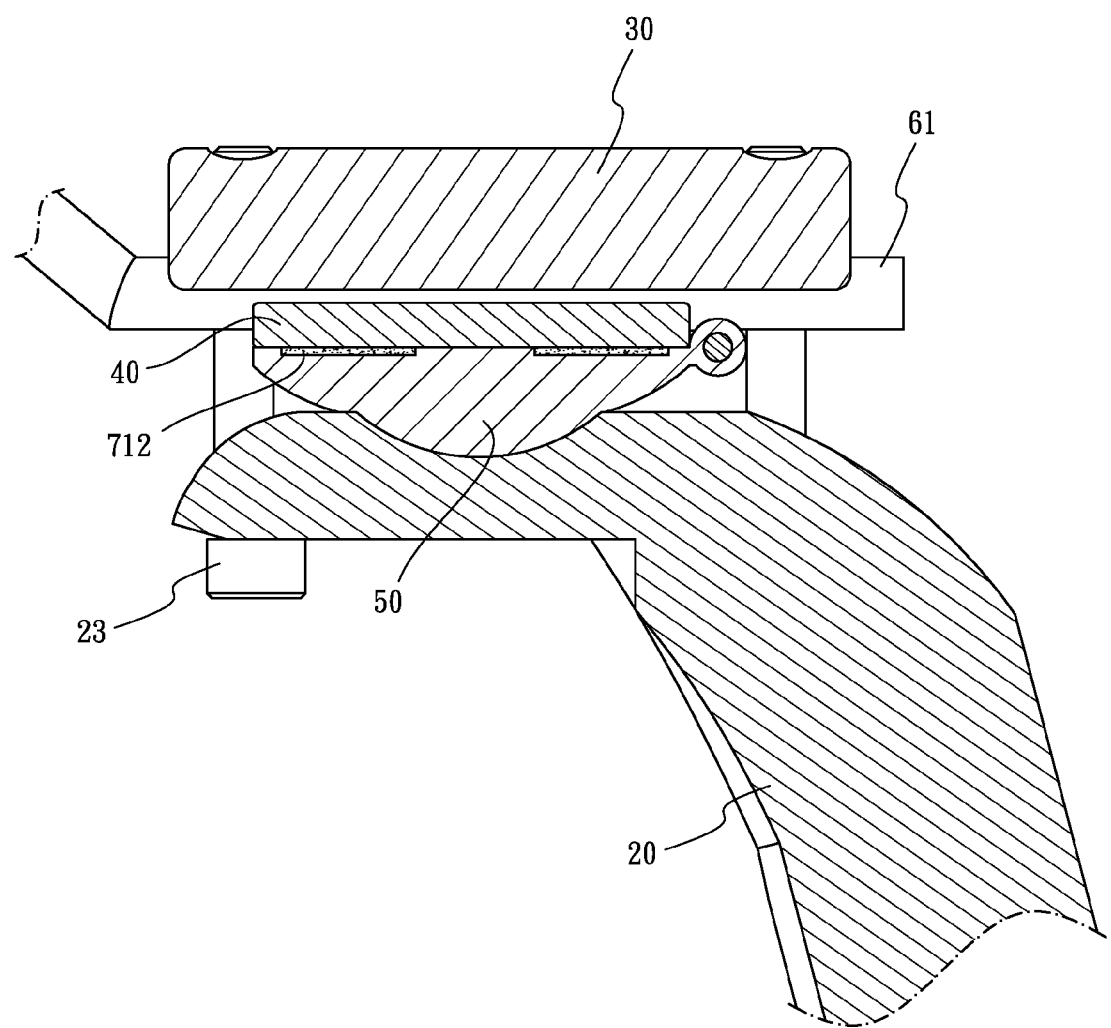
FIG. 8 is a cross sectional view of the third embodiment of the power generation device of the present invention.

FIGS. 7 and 8 show the third embodiment of the present invention, wherein the recess 43 of the top plate 40 is replaced by a space 432 located between two tubular members on one side of the top plate 40, and the protrusion 52 is replaced by a tubular member 522 on one side of the bottom plate 50, The tubular member 522 of the bottom plate 50 is located in the space 432 and between the two tubular members of one side of the top plate 40, and trained by a pin. There are four power generation plates 712 which are activated and generate power which is output from the output members to the electronic devices on the bicycle.

The power generation device of the present invention provides a convenient way to supply electric power to the electronic devices of the bicycle, and the power generation device of the present invention has least impact to the environment.

While we have shown and described the embodiment in accordance with the present invention, it should be clear to those skilled in the art that further embodiments may be made without departing from the scope of the present invention.

What is claimed is:

1. A bicycle power generation device comprising:
   a seat tube unit (10) having a seat tube (20) which has a support portion (21) on a top thereof, two first threaded holes (22) defined through the support portion (21), two bolts (23) extending through the two first threaded holes (22);
   a press plate (30) having two first grooves (31) and two second threaded holes (32), the second threaded holes (32) located corresponding to the first threaded holes (22);
   a top plate (40) having two second grooves (41) which are located corresponding to the first grooves (31), the top plate (40) having a pressing face (42) defined in an underside thereof, a recess (43) defined in the pressing face (42);
   a bottom plate (50) having a contact face (51) and a protrusion (52), the contact face (51) located corresponding to the pressing face (42), the protrusion (52) located corresponding to the recess (43), and
   a power generation unit (70) connected to the seat tube unit (10) and having at least one power generation plate (71) and an output member (72), the at least one power generation plate (71) located on the contact face (51) of the bottom plate (50) and electrically connected to the output member (72).

2. The device as claimed in claim 1, wherein the recess (43) of the top plate (40) is a space (431) and the protrusion (52) is a tubular member (521).

3. The device as claimed in claim 2, wherein the space (432) is formed on a side of the top plate (40), the tubular member (522) protrudes from a side of the bottom plate (50).

4. The device as claimed in claim 1, wherein the recess (43) is formed on a side of the top plate (40), the protrusion (52) protrudes from a side of the bottom plate (50).

* * * * *